UNITED STATES PATENT OFFICE.

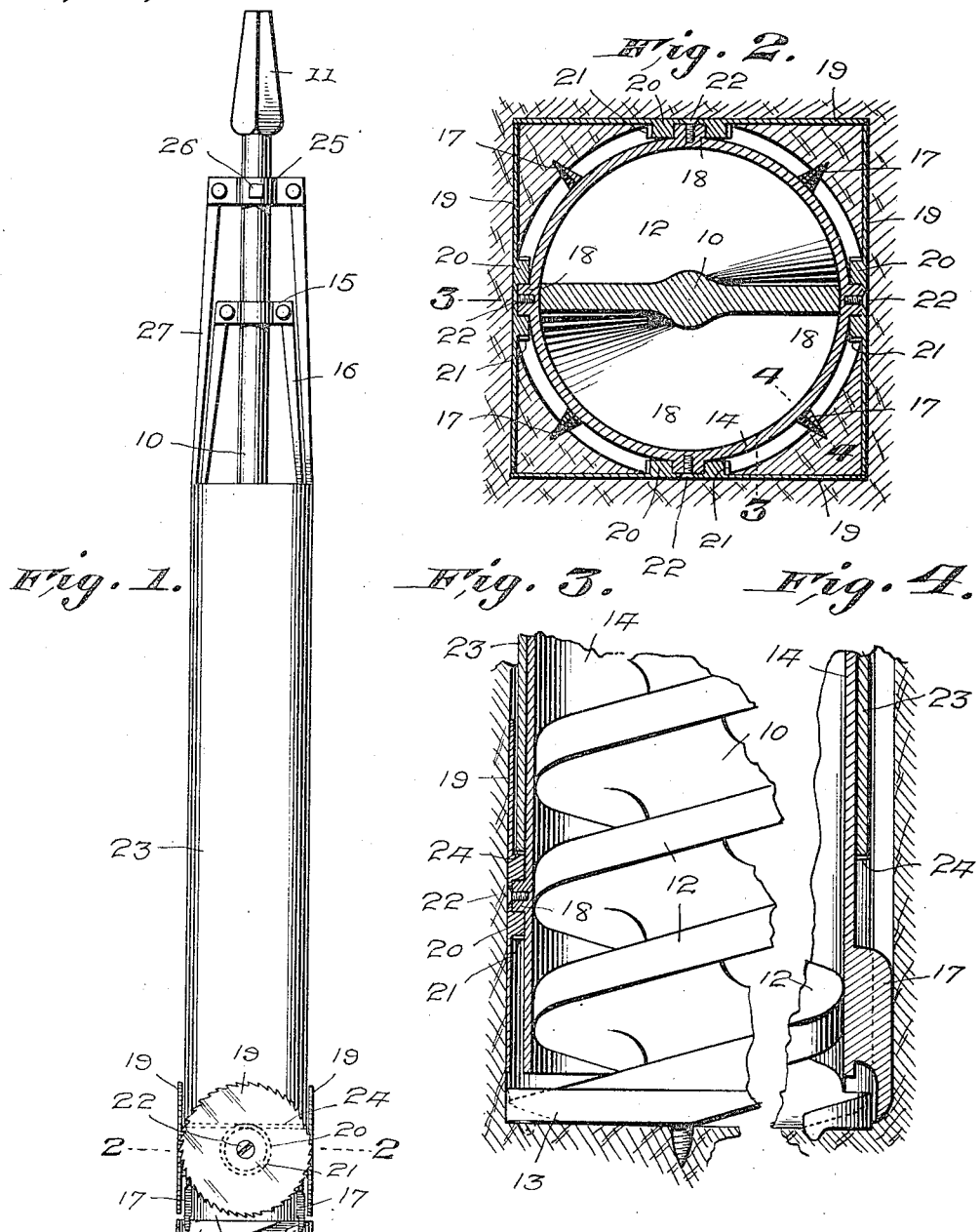

FRANK ROGERS, OF KENNA, NEW MEXICO.

SQUARE-AUGER.

1,288,685.

Specification of Letters Patent. Patented Dec. 24, 1918.

Application filed September 5, 1918. Serial No. 252,746.

*To all whom it may concern:*

Be it known that I, FRANK ROGERS, a citizen of the United States, residing at Kenna, in the county of Chaves and State of New Mexico, have invented certain new and useful Improvements in Square-Augers; and I do hereby declare the following to be a full, clear, and exact description of the invention, such as will enable others skilled in the art to which it appertains to make and use the same.

This invention relates to a square auger and particularly to a construction combining a plurality of saws coöperatively mounted in relation to an auger bit.

The invention has for an object to present a novel and improved construction of auger wherein the bit is surrounded by a relatively fixed cylinder held against movement by means entering the material to be cut, and having mounted thereon angularly disposed saws adapted to be driven by a rotated cylinder surrounding the fixed cylinder.

Another and further object of the invention is to provide an improved construction of the fixed cylinder having retaining spurs at its lower end and saws provided with geared hubs mounted upon bearings thereon together with an outer rotatable cylinder secured to the shank of the auger bit and having its lower end provided with gear teeth to engage the saw hubs.

Other and further objects and advantages of the invention will be hereinafter set forth and the novel features thereof defined by the appended claims.

In the drawing:

Figure 1 is an elevation of the invention;

Fig. 2 an enlarged cross section on line 2—2 of Fig. 1;

Fig. 3 a similar view on line 3—3 of Fig. 2; and

Fig. 4 a detail section on line 4—4 of Fig. 2.

Like numerals of reference refer to like parts in the several figures of the drawings.

The numeral 10 designates an auger bit of any desired construction provided at its upper end with an angular head 11 adapted to receive rotating means and at its lower portion with the auger bit 12 having the enlarged cutting head 13.

The auger bit 12 is surrounded by a cylinder 14 which is held in alined position at its upper end by a loosely mounted collar 15 surrounding the shank of the auger and connected to the cylinder by arms 16. This cylinder is retained against rotative movement by any desired means engaging the material to be cut, a preferred form thereof being the spurs 17 extending laterally outward from the cylinder and positioned intermediate of the saw journals 18 upon the cylinder, so as to engage the wood or material to be cut at a point which will not interfere with the free cutting action of the saws 19 which are mounted upon said bearings 18 by means of hubs 20 having gear teeth 21. The saws may be retained in position by any desired means for instance the clamping screw 22 extending into the bearings 18.

For the purpose of driving these saws an outer rotatable cylinder 23 is fitted over the fixed cylinder 14 and is provided at its lower edge with a series of gear teeth 24 meshing with the teeth 21 upon the hubs of the saws. This outer cylinder 23 is adapted to be driven with the auger bit and is clamped thereto by means of a collar 25 provided with a set screw 26 connected to the cylinder by arms 27. As shown in Fig. 2 the saws are mounted at a right angle to each other so as to cut a square or angular recess or opening through the material and the corner blocks between the auger cut and the saw cut are readily removed as they may be split off and carried by the spurs upon the fixed cylinder.

The operation of this invention will be apparent from the foregoing description from which it will be seen there is a simultaneous cutting action betwen the advancing feed of the auger bit and the saws coöperating therewith to remove the corner blocks in order to produce an angular aperture from the circular cut of the auger. This tool is adapted to be used with a hand brace or any form of operating mechanism by which a downward pressure is exerted thereon during its rotated movement and is not dependent upon any particular structure of mounting and driving mechanisms. The inner cylinder having means by which it may be held in fixed position through engagement with the material provides a convenient mounting for the saws journaled thereon while the outer rotatable cylinder revolving with the auger bit effects the cutting movement of the saws in the proper path to sever the corner blocks from the aperture through the material. The invention presents a very simple, efficient and economically manufactured form of auger adapted to produce angular apertures and especially adapted for use with any ordinary form of brace or driving member.

What I claim is:

1. In a square auger, an auger bit, a cylinder surrounding the same, means thereon to engage the material to be cut and prevent rotation of said cylinder, saws pivoted upon said cylinder, and an outer rotatable cylinder provided with means for driving said saws.

2. In a square auger, an auger bit, a cylinder surrounding the same, means thereon to engage the material to be cut and prevent rotation of said cylinder, saws pivoted upon said cylinder, and an outer rotatable cylinder provided with means for driving said saws comprising gear teeth upon its lower end engaging gears upon the hubs of said saws.

3. In a square auger, an auger bit, a cylinder surrounding the same, spurs thereon depending from its lower end to engage the material to be cut, bearing lugs upon said cylinder, saws provided with geared hubs mounted upon said lugs at a right angle to each other, and an outer rotatable cylinder having at its lower end teeth to engage said hubs.

4. In a square auger, an auger bit, a cylinder surrounding the same, spurs thereon depending from its lower end to engage the material to be cut, bearing lugs upon said cylinder, saws provided with geared hubs mounted upon said lugs at a right angle to each other, an outer rotatable cylinder having at its lower end teeth to engage said hubs, and means for securing said outer cylinder to the shank of said auger.

5. In a square auger, an auger bit, a cylinder surrounding the same and loosely mounted upon the shank of said bit, spurs projected from said cylinder to retain it against rotation, bearing lugs upon said cylinder intermediate of said spurs, saws having geared hubs mounted upon said lugs at a right angle to each other, and an outer cylinder secured to the shank of said bit and provided at its lower end with teeth to engage the gears of said saws.

In testimony whereof I have signed my name to this specification in the presence of two subscribing witnesses.

FRANK ROGERS.

Witnesses:
J. H. HATHCOCK,
W. H. CRYER.

Copies of this patent may be obtained for five cents each, by addressing the "Commissioner of Patents, Washington, D. C."